(12) United States Patent  
Kozyuk et al.

(10) Patent No.: US 8,709,109 B2
(45) Date of Patent: *Apr. 29, 2014

(54) PROCESS FOR IMPROVED BIODIESEL FUEL

(75) Inventors: Oleg Kozyuk, North Ridgeville, OH (US); Peter Reimers, Shaker Heights, OH (US); Paul A. Reinking, North Olmsted, OH (US)

(73) Assignee: Arisdyne Systems Incorporated, Cleveland, OH (US)

( * ) Notice: Subject to any disclaimer, the term of this patent is extended or adjusted under 35 U.S.C. 154(b) by 636 days.

This patent is subject to a terminal disclaimer.

(21) Appl. No.: 12/685,155

(22) Filed: Jan. 11, 2010

(65) Prior Publication Data

US 2010/0175309 A1   Jul. 15, 2010

Related U.S. Application Data

(60) Provisional application No. 61/143,915, filed on Jan. 12, 2009.

(51) Int. Cl.
*C10L 1/19* (2006.01)
*C11B 3/02* (2006.01)
*C11B 3/04* (2006.01)
*C11B 3/06* (2006.01)
*C07C 67/00* (2006.01)

(52) U.S. Cl.
USPC ............. 44/388; 44/385; 554/170; 554/174; 554/175

(58) Field of Classification Search
USPC .................. 44/385, 388; 554/170, 174, 175
See application file for complete search history.

(56) References Cited

U.S. PATENT DOCUMENTS

| | | |
|---|---|---|
| 5,810,052 A | 9/1998 | Kozyuk et al. |
| 5,931,771 A | 8/1999 | Kozyuk |
| 5,937,906 A | 8/1999 | Kozyuk |
| 5,971,601 A | 10/1999 | Kozyuk |
| 6,012,492 A | 1/2000 | Kozyuk |
| 6,318,649 B1 | 11/2001 | Mazurkiewicz |
| 6,502,979 B1 | 1/2003 | Kozyuk |
| 6,802,639 B2 | 10/2004 | Kozyuk |
| 6,857,774 B2 * | 2/2005 | Kozyuk ................. 366/263 |
| 6,884,900 B2 | 4/2005 | Maeda et al. |
| 7,101,691 B2 | 9/2006 | Kinley et al. |
| 7,754,905 B2 | 7/2010 | Kozyuk |
| 7,935,157 B2 * | 5/2011 | Kozyuk et al. ........... 44/308 |
| 2004/0028622 A1 | 2/2004 | Gurin |
| 2004/0159537 A1 | 8/2004 | Maeda et al. |

(Continued)

FOREIGN PATENT DOCUMENTS

WO   2008/140997 A1   11/2008

OTHER PUBLICATIONS

K.S. Suslick, Science, vol. 247, Mar. 23, 1990, pp. 1439-1445.

(Continued)

*Primary Examiner* — Pamela H Weiss
(74) *Attorney, Agent, or Firm* — Pearne & Gordon LLP

(57) ABSTRACT

A process for preparing biodiesel having improved filterability characteristics including inducing transesterification of a triglyceride feedstock with cavitation to form an intermediate reaction product. Glycerol by product is separated from the intermediate reaction product before finishing the transesterification reaction in a pressurized reaction tank to yield a biodiesel reaction product. The biodiesel reaction product can be further purified by removing glycerol.

19 Claims, 1 Drawing Sheet

(56) References Cited

U.S. PATENT DOCUMENTS

| | | | |
|---|---|---|---|
| 2005/0027137 A1* | 2/2005 | Hooker | 554/176 |
| 2006/0224005 A1* | 10/2006 | Felly | 554/174 |
| 2006/0260184 A1* | 11/2006 | Landano | 44/308 |
| 2007/0055073 A1* | 3/2007 | McGurk | 554/174 |
| 2007/0175092 A1* | 8/2007 | Ames | 44/629 |
| 2007/0214712 A1* | 9/2007 | Garwood | 44/308 |
| 2008/0092435 A1 | 4/2008 | Bzdek et al. | |
| 2009/0000941 A1* | 1/2009 | Kropf | 204/157.62 |
| 2009/0038210 A1 | 2/2009 | Kozyuk et al. | |
| 2009/0043118 A1 | 2/2009 | Kozyuk | |
| 2009/0182159 A1 | 7/2009 | Gordon et al. | |
| 2009/0188157 A1 | 7/2009 | Holloway et al. | |

OTHER PUBLICATIONS

International Search Report and Written Opinion issued Aug. 30, 2011 in PCT Application PCT/US2010/059164.

* cited by examiner

PROCESS FOR IMPROVED BIODIESEL FUEL

This application claims the benefit of U.S. provisional application Ser. No. 61/143,915 filed Jan. 12, 2009, the contents of which are incorporated herein in their entirety by reference.

FIELD OF THE INVENTION

The invention relates to a process for preparing biodiesel, and more particularly, a process for improving the quality of biodiesel using cavitation to enhance filterability of the biodiesel and remove impurities from the biodiesel.

BACKGROUND OF THE INVENTION

Biodiesel is prepared by a base-catalyzed transesterification of triglycerides such as vegetable oils and animal fats. The transesterification reaction involves reacting triglycerides with an alcohol to form fatty acid alkyl esters and glycerol. The purified esters can be used as biodiesel fuel, whereas glycerol is formed as a byproduct of this process.

Filter plugging and engine failure due to precipitate formation at low temperatures are common problems of vehicles using biodiesel blends. Precipitates can include steryl glucosides, such as phosphorous glucosides, and non-methyl esters, which can increase filtration time and promote crystallization of other compounds contained in the biodiesel. Even at low levels, steryl glucosides can form aggregates with fatty acid methyl esters that may appear as a visible cloud. Aggregates can accelerate filter plugging at a wide range of temperatures due to the high melting point of steryl glucosides. At room temperatures, steryl glucosides can aggregate and plug filters used for biodiesel fuel. At cold temperatures, the cold-flow problems caused by alkyl esters of saturated fatty acids such as monoacylglycerols may be compounded by the presence of steryl glucosides.

Formation of steryl glucosides in biodiesel also may be exacerbated in the presence of trace amounts of water. Unlike alkyl esters of saturated fatty acids, steryl glucosides cannot be easily removed by melting or exposure to heat because the melting point of steryl glucosides is about 240° C. Further, because steryl glucosides are insoluble in many solvents, the cleaning of components having accumulated steryl glucosides can be problematic.

Recent changes in ASTM D6751-08 Standard Specifications for Biodiesel Fuel Blend Stock (B100) include mandatory compliance for biodiesel to meet cold soak filtration specifications. The test subjects biodiesel (B100) to a soak period at cold temperatures, re-warms the biodiesel, and then filters the biodiesel through a 0.7 micron filter, a ASTM D6217 procedure. The test is a qualitative evaluation meant to replicate performance of the biodiesel in cold climates. Developing a cost-effective process for reducing sterol glucosides and other contaminants can result in reduced precipitate formation, and minimize filter plugging problems for automotive fuel delivery systems. By improving its quality, biodiesel can become more competitive on the market, and public acceptance can be enhanced.

A number of processing techniques exist to address removing contaminants, such as ambient filtering, cold filtering, water degummimg, absorbent treatment and vacuum distillation. However, these methods do not provide an energy efficient and cost effective process to remove non-methyl ester impurities and other contaminants from biodiesel fuels and minimize the precipitation problems associated with biodiesel. Accordingly, there is a need for processes for preparing biodiesel fuels and blends able to meet the required purity specifications without forming harmful precipitates that can lead to fuel filter plugging.

SUMMARY OF THE INVENTION

A process for preparing biodiesel having improved filterability including mixing a triglyceride feedstock, alcohol and catalyst to form a pre-reaction mixture. An intermediate biodiesel reaction mixture is formed by applying cavitational energy to induce an initial transesterification reaction in the pre-reaction mixture, wherein the formed intermediate biodiesel reaction mixture includes fatty acid alkyl esters, unreacted triglyceride feedstock; unreacted alcohol, unreacted catalyst and glycerol. The transesterification of the pre-reaction mixture converts more than 60 weight percent of the triglycerides in the pre-reaction mixture. A portion of the formed glycerol is removed from the intermediate biodiesel reaction mixture, for example, by introducing the intermediate biodiesel reaction mixture into a separation vessel, to form a biodiesel reaction mixture. The biodiesel reaction mixture is agitated in a pressurized reaction tank to form a biodiesel reaction product including fatty acid alkyl esters, unreacted catalyst, unreacted alcohol and glycerol.

A process for preparing biodiesel having improved filterability including mixing a triglyceride feedstock, alcohol and catalyst to form a pre-reaction mixture. An intermediate biodiesel reaction mixture is formed by applying cavitational energy to induce an initial transesterification reaction in the pre-reaction mixture, wherein the formed intermediate biodiesel reaction mixture includes fatty acid alkyl esters, unreacted triglyceride feedstock; unreacted alcohol, unreacted catalyst and glycerol. The transesterification of the pre-reaction mixture converts more than 60 weight percent of the triglycerides in the pre-reaction mixture. The intermediate biodiesel reaction mixture is agitated in a pressurized reaction tank to form a biodiesel reaction product including fatty acid alkyl esters, unreacted catalyst, unreacted alcohol and glycerol. A portion of the formed glycerol is removed from the biodiesel reaction product, for example, by introducing the intermediate biodiesel reaction product into a separation vessel to form a purified biodiesel reaction product.

DETAILED DESCRIPTION OF THE INVENTION

Figure 1:
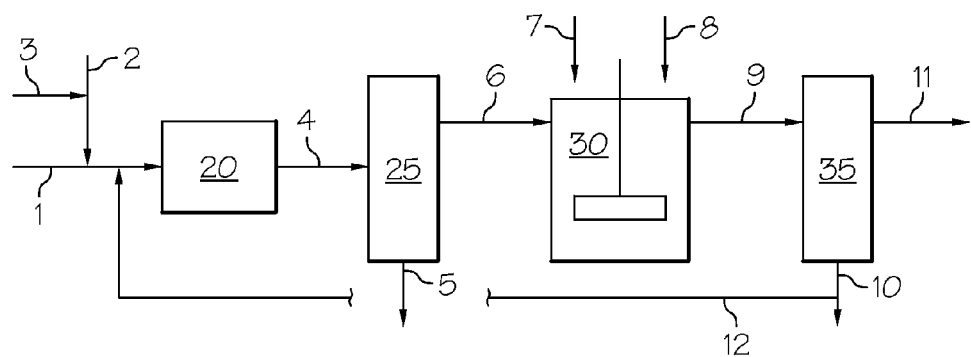
FIG. 1 shows a flow diagram of a biodiesel production process using cavitation.

Herein, when a range such as 5-25 (or 5 to 25) is given, this means preferably at least 5 and, separately and independently, preferably not more than 25. In an example, such a range defines independently not less than 5, and separately and independently, not less than 25.

The use of cavitational energy to process a pre-reaction mixture of triglyceride feedstock (e.g., fat or oil), alcohol and a catalyst can improve filterability and reduce formation of precipitates in biodiesel. For example, applying cavitation energy to a pre-reaction mixture starting with vegetable oil(s) or fats and alcohol in the presence of a catalyst can reduce cold soak filtration time of biodiesel. The cavitational energy acts to provide a high level of energy to the transesterification reaction of a pre-reaction mixture, which may entrap impurities in the glycerol by product. The high level of energy created by supplying cavitational energy is used to induce an initial transesterification reaction and yield an intermediate biodiesel reaction product or mixture. Separation tanks can provide a means for removing glycerol from the intermediate biodiesel reaction mixture before the transesterification reaction is continued or completed in a pressurized reaction tank. By using cavitational energy in the initial transesterification reaction, impurities are more easily removed before the reaction mixture is introduced into a conventional pressurized reaction tank. Thus the use of cavitational energy results in a cost-effective and efficient process for preparing biodiesel having improved filterability characteristics, such as a reduced cold soak filtration time.

A pre-reaction mixture for applying cavitational energy includes a triglyceride feedstock, alcohol and a catalyst. The triglyceride feedstock source can be, but is not limited to, soybean oil, such as crude de-gummed once-refined soy oil, corn oil, cottonseed oil, olive oil, palm oil, palm kernel oil, peanut oil, linseed oil, safflower oil, canola oil, rapeseed oil, sesame oil, coconut oil, jatrohpa oil, mustard seed oil, castor oil, tall oil, algae oil, soap stock, tallow, lard, brown grease, white grease, yellow grease, fish oils, bacterial oils or fungal oils, as well as wastes, effluents and residues from the processing of such materials. The feedstock source can also be comprised of multiple free fatty acid sources, such as blends of oils and/or animal fats. The triglyceride feedstock preferably contains a content of free fatty acid in the range of 0.1 to 3% by weight of the feedstock.

The alcohol 2 can be a lower alcohol having one to five carbon atoms, wherein the alcohol can also be branched or unbranched. For example, the lower alcohol can be selected from the group consisting of methanol, ethanol, and mixtures thereof. The quantity of alcohol in the pre-reaction mixture can be a ratio of triglyceride feedstock to alcohol of 1:3 to 1:5, or as shown below in the Examples, 1:4.2. The catalyst 3 can be acidic or basic. Suitable acid catalysts are sulfuric acid, hydrochloric acid, phosphoric acid, an acidic metal halide or another strong Lewis or strong Bronsted acid or combinations thereof. The catalyst can also include sodium methylate, sodium hydroxide or potassium hydroxide, which may be used independently or as their mixture of suitable mixing ratio. The weight percent of catalyst to triglyceride feedstock can be in the range of 0.1 to 1, or as shown below in the Examples, 0.35.

A pre-reaction mixture can subjected to cavitational energy prior to being feed into a pressurized reaction tank. Flow rate of a pre-reaction mixture through the cavitational energy source can be varied as desired, for example, the flow rate can be in the range of 0.1 to 10 gpm. Examples of cavitational energy sources for applying cavitational energy to a pre-reaction mixture that can be used include, but are not limited to, static and dynamic cavitation sources or apparatuses, the controlled hydrodynamic cavitation apparatus described in U.S. Pat. Nos. 5,810,052; 5,931,771; 5,937,906; 5,971,601; 6,012,492; 6,502,979; 6,802,639; 6,857,774, the contents of which are incorporated herein by reference in their entirety, a piston gap homogenizer, impinging jet homogenizer and similar homogenizers and the like. In another embodiment, cavitational energy can be brought about, for example, by the use of ultrasound (e.g., the Branson Sonifiers, Sonics & Materials Processors, Sonic Corp. Sonolators), Rotor-Stator mixers (e.g., IKA WORKS, Kady International, Charles Ross and Son Company, Silverson Machines), Rotor-Rotor mixers (e.g., Pulsar), Colloid mills (e.g., Greerco, Sonic Corp., APV), any others cavitation dynamic reactor/mixer (e.g., Kreido Laboratories, Hydro Dynamics) as known in the art. As discussed in the Examples below, cavitational energy can be created by passing the pre-reaction mixture through static cavitation reactor having multiple orifices in series, such as a first orifice stage containing two 0.58 mm orifices in series and a second orifice stage containing two 0.64 mm orifices in series.

In general, cavitation can be described as the generation, subsequent growth and collapse of cavitation bubbles and cavities. During the collapse of the cavitation bubbles, high-localized pressures and temperatures are achieved, with some estimations of 5000° C. and pressure of approximately 500 kg/cm$^2$ (K. S. Suslick, Science, Vol. 247, 23 Mar. 1990, pgs. 1439-1445). High temperatures and pressures can stimulate the progress of various chemical reactions which may not be possible under ordinary conditions, such as standard temperature and pressure, STP. Thus, it is possible to carry out a reaction in liquid under the influence of cavitation. Without intending to be bound by any one theory, it is believed that the applying cavitational energy and achieving high reaction conversions in a short period time, such as seconds or less than one minute, may reduce the cost of producing biodiesel and result in that many of the non-methyl esters components and/or other impurities become entrapped in the glycerol by product.

Referring now to the drawings, various embodiment of the present invention will be described. As shown in the drawings, pipes, hoses, or other conventional, industrial equipment can be used to facilitate the fluid communication of the elements and streams discussed below.

FIG. 1 shows a flow diagram of a biodiesel production process, which includes a cavitational energy source or cavitation apparatus 20. A pre-reaction mixture is fed into the cavitation apparatus 20. The pre-reaction mixture can be formed by mixing a triglyceride feedstock 1, alcohol 2 and a catalyst 3. The triglyceride feedstock 1 preferably contains less than 1.5 weight percent free fatty acid, and preferably less than 200 ppm phosphorous or a phosphorous compound. As discussed in FIG. 3, the pre-reaction mixture can be heated before being subjected to cavitational energy. In one example, any one component of the pre-reaction mixture, for example the triglyceride, alcohol or catalyst, can be heated to a temperature in the range of 60° C. to 150° C.

An intermediate biodiesel reaction mixture 4 including fatty acid alkyl esters and glycerol can be formed by supplying cavitational energy to induce a transesterification reaction. Cavitational energy can be supplied by subjecting the pre-reaction mixture to cavitation by passing it through at least one cavitation apparatus 20, such as a flow-through constriction orifice, an ultrasonic transducer, a homogenizer, a rotor-stator mixer, a colloid mill or the like. For example, the pre-reaction mixture can be fed into the cavitation apparatus 20 at any desired temperature, for instance, the mixture can be in the temperature range of 0° C. to 150° C., 25° C. to 125° C. or 50° C. to 100° C. As shown in the Examples below, the pre-reaction mixture can be introduced into the cavitation apparatus 20 at a temperature of 65° C. or 100° C. The cavitation apparatus 20 induces the initial transesterification reaction to produce an intermediate biodiesel reaction mixture 4. As noted above, the initial transesterification reaction creates an intermediate biodiesel reaction mixture 4 including fatty acid alkyl esters, glycerol, impurities, unreacted catalyst, unreacted alcohol and unreacted triglyceride feedstock. Preferably, at least 60 weight percent of the triglycerides in the pre-reaction mixture are reacted or converted, thus leaving 40 weight percent or less of triglyceride from the pre-reaction mixture available for conversion. Alternatively, at least 65, 70, 75, 80, 85 or 90 weight percent of the triglycerides in the pre-reaction mixture are reacted in the initial transesterification reaction induced by the cavitation apparatus 20. Reaction times of the pre-reaction mixture in the cavitation apparatus 20 can range from 2 minutes to 1 second depending on reaction conditions and desired conversion. In one example, the reaction time of the pre-reaction mixture can be in the range of 30 seconds to 10 seconds, or as shown in the Examples, 15 seconds and 12 seconds. Preferably, the reaction time of the pre-reaction mixture being supplied with cavitational energy is less than 40, 30, 25 or 20 seconds.

The intermediate biodiesel reaction mixture 4 is fed into a separation vessel 25, which removes a portion of the glycerol from the intermediate biodiesel reaction mixture 4. The separation vessel 25 can be a conventional separation tank. The intermediate biodiesel reaction mixture 4 is separated into two parts, a waste glycerol stream 5 and a biodiesel reaction mixture 6. By introducing the intermediate biodiesel reaction mixture 4 into a separation vessel 25 before being agitated in the pressurized reaction tank 30, glycerol by product generated during the initial transesterification reaction in the cavitation apparatus 20 can be removed to yield a biodiesel reaction mixture 6 having a reduced amount of impurities. Separation temperatures in the separation vessel 25 can be adjusted as desired, for example, the separation temperature can be in the range of 20° C. to 150° C., 30° C. to 100° C. or 40° C. to 80° C. As shown in the Examples below, the intermediate biodiesel reaction mixture 4 can be introduced into the separation vessel 25 at a temperature in the range of 20° C. to 60° C. Thus, as discussed below, the biodiesel reaction mixture 6 can be fed into the pressurized reaction tank 30 at a temperature of 30° C. to 65° C.

The separation vessel 25 provides an efficient and cost-effective option for eliminating impurities, such as phosphorous or a phosphorous compound, than can affect cold soak filtration times. By removing impurities from the intermediate biodiesel reaction mixture 4, the need for downstream purification is reduced. As noted above, the cavitation apparatus 20 facilitates transesterification reactions in short periods of time and also supplies tremendous amounts of energy which acts to mix and/or break apart compounds as cavitation bubbles collapse with the liquid. As compared to conventional mixing and agitating in a reaction vessel, the high energy mixing associated with cavitation increases the esterification reaction sites, but also has a tendency to entrap impurities in the glycerol by product. Thus, the separated waste glycerol stream 5 from separation vessel 25 reduces the amount of potential filter-clogging impurities downstream of a biodiesel process.

The biodiesel reaction mixture 6 is fed into and agitated in a pressurized reaction tank 30 to form a biodiesel reaction product 9. Pressure in the reaction tank 30 can be adjusted as desired, for example the pressure can range from 0 psig to 100 psig. A conventional reaction tank, vessel or mixer can be used for continuing or finishing the initial transesterification reaction induced in the cavitation apparatus 20. Preferably, the biodiesel reaction mixture 6 is mixed or agitated in the pressurized reaction tank 30 until at least 90, 95, 96, 97, 98 or 99 weight percent of the triglycerides by weight of the pre-reaction mixture are reacted or converted. The yield of fatty acid alkyl esters can be calculated from samples of the reacted mixture to determine the time necessary to achieve the desired yield. Reaction mixing times in the pressurized reaction tank 30 can range from 10 hours to 1 minute, 5 hours to 30 minutes or 4 hours to 1 hour. As shown in the Examples below, reaction times in a pressurized reaction tank can be in the range of 4 hours to 3 minutes. Reaction mixing temperatures in the pressurized reaction tank 30 can range, from 20° C. to 150° C., 30° C. to 100° C. or 40° C. to 80° C. As shown in the Examples below, reaction mixing temperatures can be in the range of 65° C. to 90° C.

Alcohol 7 and catalyst 8 can be added to the pressurized reaction tank 30 to continue or finish the transesterification reaction. Depending on the quantity of unreacted alcohol and unreacted catalyst being removed from the separation vessel 25 in the waste glycerol stream 5, fresh alcohol 7 and catalyst 8 may be needed to continue the reaction. The amount of alcohol 7 and catalyst 8 added to the pressurized reaction tank 30 can be adjusted as desired. If used, the alcohol 7 and catalyst 8 added preferably is the same as used in the pre-reaction mixture.

Upon completion of the transesterification reaction, or the desired conversion rate of triglyceride in the pre-reaction mixture, in the pressurized reaction tank 30, the biodiesel reaction product 9 is fed into a separation vessel 35. For example, the separation vessel 35 can be a conventional separation tank. The biodiesel reaction product 9 includes fatty acid alkyl esters, glycerol, unreacted alcohol, unreacted catalyst, unreacted triglyceride and other impurities. The separation vessel 35 provides an efficient process for removing glycerol, unreacted alcohol, unreacted catalyst, unreacted triglycerides and impurities from the biodiesel reaction product 9. Thus, the biodiesel reaction product 9 is separated into two parts, a waste stream 10 and a purified biodiesel reaction product 11. The purified biodiesel reaction product 11 preferably has a cold soak filtration time as determined by a ASTM D6217 procedure of less than 200, 175, 150, 140, 130, 120, 110, 100, 90, 85, 80, 75 or 70 seconds. The purified biodiesel reaction product 11 preferably has less than 30, 25, 20, 15, 10 or 5 ppm of phosphorous or a phosphorus compound such as phosphorous steryl glucoside.

As noted above, applying cavitational energy provides high energy mixing that, in theory, entraps impurities in the waste glycerol. Convention mixing or agitating utilized by reaction tanks in a biodiesel product processes does not impart the high energy mixing associated with cavitation. In one embodiment, the waste stream 10 being separated from the biodiesel reaction product 9, or a portion thereof, can be recycled, shown as stream 12. The waste stream 12 can be used to form a portion of the pre-reaction mixture being fed into the cavitation apparatus 20. Portions of the unreacted alcohol, unreacted catalyst and unreacted triglyceride can form the pre-reaction mixture and be reacted in the cavitation apparatus 20. Any glycerol present in the waste stream 12 can be further mixed in the cavitation apparatus 20, and preferably entrap impurities that lead to filter clogging and an increase of cold soak filtration times of the biodiesel product. Alternatively, the waste stream 10 can be discarded and not recycled.

Figure 2:
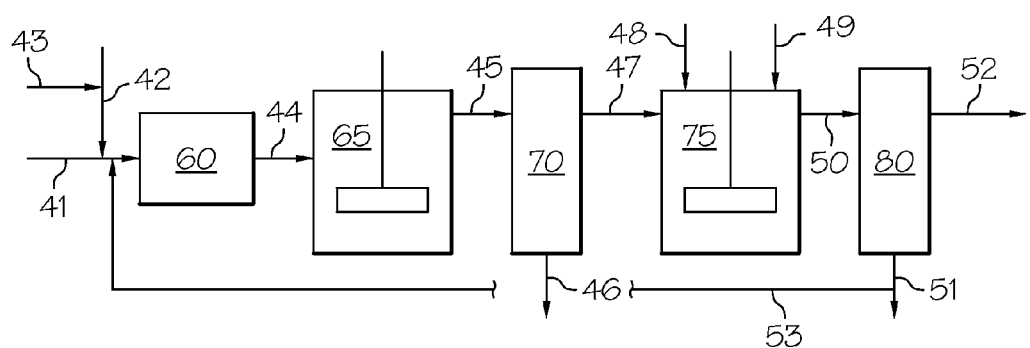
FIG. 2 shows a flow diagram of a biodiesel production process using cavitation.

FIG. 2 shows a flow diagram of a biodiesel production process, such as a convention two-stage biodiesel production process, which further includes a cavitational energy source or cavitation apparatus 60 to prepare biodiesel having improved filterability. As shown at the beginning of the process, a pre-reaction mixture is mixed including a triglyceride feedstock 41, alcohol 42 and a catalyst 43 and then fed into the cavitation apparatus 60. The triglyceride feedstock 41 preferably contains less than 1.5 weight percent free fatty acid, and preferably less than 200 ppm phosphorous or a phosphorous compound.

An intermediate biodiesel reaction mixture 44 including fatty acid alkyl esters and glycerol can be formed by supplying cavitational energy to induce a transesterification reaction. Cavitational energy can be supplied by subjecting the pre-reaction mixture to cavitation by passing it through at least one cavitation apparatus 60, such as a flow-through constriction orifice, an ultrasonic transducer, a homogenizer, a rotor-stator mixer, a colloid mill or the like. For example, the pre-reaction mixture can be fed into the cavitation apparatus 60 at any desired temperature, for example, the mixture can be in the temperature range of 0° C. to 150° C., 25° C. to 125° C. or 50° C. to 100° C. As discussed above, the cavitation apparatus 60 induces the initial transesterification reaction to produce an intermediate biodiesel reaction mixture 44 including fatty acid alkyl esters, glycerol, impurities, unreacted catalyst, unreacted alcohol and unreacted triglyceride feedstock, which is fed into a pressurized reaction tank 65. Preferably, at least 60 weight percent of the triglycerides in the pre-reaction mixture are reacted, and alternatively, at least 65, 70, 75, 80, 85 or 90 weight percent of the triglycerides in the pre-reaction mixture are reacted in the initial transesterification reaction induced by the cavitation apparatus 60. Reaction times of the pre-reaction mixture in the cavitation apparatus 60 can range from 2 minutes to 1 second depending on reaction conditions and desired conversion. Preferably, the reaction time of the pre-reaction mixture being supplied with cavitational energy is less than 40, 30, 25 or 20 seconds.

The intermediate biodiesel reaction mixture 44 is fed into and agitated in a pressurized reaction tank 65 to form a biodiesel reaction product 45. Pressure in the reaction tank 65 can be adjusted as desired, for example the pressure can range from 0 psig to 100 psig. A conventional reaction tank, vessel or mixer can be used for continuing or finishing the initial transesterification reaction induced in the cavitation apparatus 60. The intermediate biodiesel reaction mixture 44 is mixed or agitated in the pressurized reaction tank 65 until at least 80, 85, 90, 92, 95 or 98 weight percent of the triglycerides by weight of the pre-reaction mixture are reacted or converted, thereby forming a biodiesel reaction product 45. Reaction mixing times in the pressurized reaction tank 65 can be adjusted as desired depending on the conversion rate needed, for example, reaction time can range from 10 hours to 1 minute. Reaction mixing temperatures in the pressurized reaction tank 65 can range from 20° C. to 150° C., 30° C. to 100° C. or 40° C. to 80° C.

Although not shown, additional alcohol and catalyst can be optionally added directly to the pressurized reaction tank 65. Conventional two-stage biodiesel production processes include a first reactor, shown as tank 65 in FIG. 2. In such a process, a first reactor would not generally require additional alcohol and catalyst if the pre-reaction mixture includes adequate amounts of alcohol and catalyst. As shown in FIG. 2, a cavitation apparatus 60 is retro-fitted to a conventional two-stage biodiesel process.

The remaining portion of the biodiesel process of FIG. 2 includes the biodiesel reaction product 45 from pressurized reaction tank 65 being introduced into separation vessel 70 to remove a portion of glycerol from the biodiesel reaction product 45. As, discussed above, the separation vessel 70 can be a conventional separation tank. The biodiesel reaction product 45 is separated into two parts, a waste glycerol stream 46 and a purified biodiesel product 47. The waste glycerol stream 46 includes glycerol, impurities, such as steryl glucosides, unreacted alcohol, unreacted catalyst and unreacted triglyceride. By introducing the biodiesel reaction product 45 into a separation vessel 70 before being agitated in the second pressurized reaction tank 75, glycerol by product generated during the initial transesterification reaction in the cavitation apparatus 60 and pressurized reaction tank 65 can be removed to yield a purified biodiesel reaction product 47 to be further reacted. Separation temperatures in the separation vessel 70 can be adjusted as desired, for example, the separation temperature can be in the range of 20° C. to 150° C., 30° C. to 100° C. or 40° C. to 80° C.

The purified biodiesel reaction product 47 is fed into and agitated in the second pressurized reaction tank 75 to finish the transesterification reaction of the triglycerides. Pressure in the secondary reaction tank 75 can be adjusted as desired as noted above. The reaction tank 75 can be a conventional reaction tank, vessel or mixer as conventionally used for continuing or finishing the initial transesterification reaction induced in the cavitation apparatus 20 and reaction tank 65. Preferably, conversion rates of at least 95, 96, 97, 98 or 99 weight percent of the triglycerides by weight of the pre-reaction mixture are reached in the secondary pressurized reaction tank 75. Reaction mixing times and temperatures in reaction tank 75 can be adjusted as desired, for example, as discussed above with regard to pressurized reaction tank 65.

Alcohol 48 and catalyst 49 can be added to the secondary pressurized reaction tank 75 to continue or finish the transesterification reaction. Depending on the quantity of unreacted alcohol and unreacted catalyst being removed from the separation vessel 70 in the waste glycerol stream 46, fresh alcohol 48 and catalyst 49 may be needed to continue or finish the reaction. The amount of alcohol 48 and catalyst 49 added to the secondary pressurized reaction tank 75 can be adjusted as desired and if used, the alcohol 48 and catalyst 49 added preferably is the same as used in the pre-reaction mixture fed to cavitation apparatus 60.

Upon completion of the transesterification reaction, or the desired conversion rate of triglyceride in the pre-reaction mixture, in the secondary pressurized reaction tank 75, the secondary biodiesel reaction product 50 is fed into a separation vessel 80. The secondary biodiesel reaction product 50 includes fatty acid alkyl esters, glycerol, unreacted alcohol, unreacted catalyst, unreacted triglyceride and other impurities, such as steryl glucosides. The separation vessel 80 provides an efficient process for removing glycerol, unreacted alcohol, unreacted catalyst, unreacted triglycerides and impurities from the secondary biodiesel reaction product 50, separating product 50 into two parts, a waste stream 51 and a purified secondary biodiesel reaction product 52.

The purified secondary biodiesel reaction product 52 preferably has a cold soak filtration time as determined by a ASTM D6217 procedure of less than 200, 175, 150, 140, 130, 120, 110, 100, 90, 85, 80, 75 or 70 seconds. The purified secondary biodiesel reaction product 52 preferably has less than 30, 25, 20, 15, 10 or 5 ppm of phosphorous or a phosphorus compound such as phosphorous steryl glucoside. The waste stream 51 separated from the secondary biodiesel reaction product 50, or a portion thereof, can be recycled if desired. The waste stream 53 can be used to form a portion of the pre-reaction mixture being fed into the cavitation apparatus 60. Portions of the unreacted alcohol, unreacted catalyst and unreacted triglyceride can form the pre-reaction mixture and be reacted in the cavitation apparatus 60. Any glycerol present in the waste stream 53 can be further mixed in the cavitation apparatus 60, and preferably entrap impurities that lead to filter clogging and an increase of cold soak filtration times of the biodiesel product. Alternatively, the waste stream 51 can be discarded and not recycled.

Figure 3:
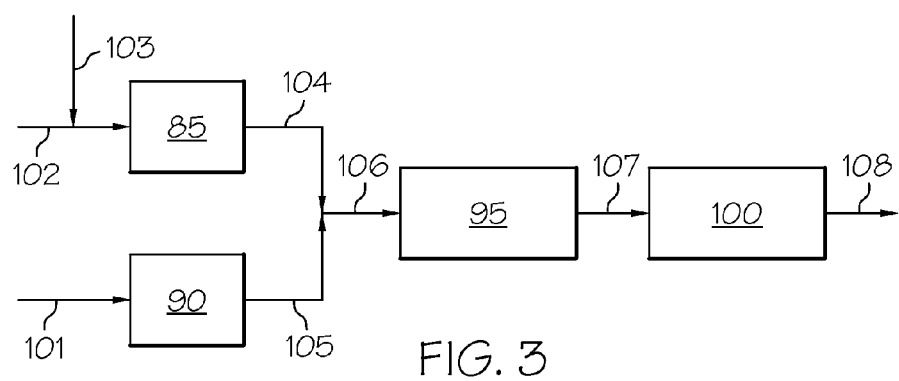
FIG. 3 shows a flow diagram for adjusting temperature in a biodiesel production process using a cavitation.

FIG. 3 shows a flow diagram of a biodiesel production process, which includes a cavitational energy source or cavitation apparatus 95. A heated pre-reaction mixture 106 including triglyceride, alcohol and catalyst is fed into the cavitation apparatus 95. The heated pre-reaction mixture 106 is prepared by mixing heated triglyceride feedstock 101 form heat exchanger 90 with a heated blend of alcohol 102 and catalyst 103 from heat exchanger 85. The triglyceride feedstock 101 preferably contains less than 1.5 weight percent free fatty acid, and preferably less than 200 ppm phosphorous or a phosphorous compound.

The pre-reaction mixture 106 can be fed into the cavitation apparatus 95 at any desired temperature, for example, the mixture can be in the temperature range of 0° C. to 150° C., 25° C. to 125° C. or 50° C. to 100° C. Preferably, heat exchangers 85 and 90 are utilized to form a pre-reaction mixture at a temperature above 60° C., or as shown in the Examples below, at a temperature of 100° C. The cavitation apparatus 95 induces the initial transesterification reaction to produce an intermediate biodiesel reaction mixture 107. The initial transesterification reaction creates an intermediate biodiesel reaction mixture 107 including fatty acid alkyl esters, glycerol, impurities, unreacted catalyst, unreacted alcohol and unreacted triglyceride feedstock. Preferably, at least 60 weight percent of the triglycerides in the pre-reaction mixture 106 are reacted. Alternatively, at least 65, 70, 75, 80, 85 or 90 weight percent of the triglycerides in the pre-reaction mixture are reacted in the initial transesterification reaction induced by the cavitation apparatus 95. Reaction times of the pre-reaction mixture in the cavitation apparatus 95 can range from 2 minutes to 1 second depending on reaction conditions and desired conversion.

The intermediate biodiesel reaction mixture 107 can be cooled by heat exchanger 100 before being fed into a downstream pressurized reaction tank to finish or continue the transesterification reaction. For example, the intermediate biodiesel reaction mixture 107 can be used in the biodiesel processes as shown in FIGS. 1 and 2. Preferably, heat exchanger 100 cools the intermediate biodiesel reaction mixture below 65° C.

As shown in FIGS. 1, 2 and 3, cavitational energy can be used in existing processes to improve the filterability of biodiesel. For example, a device or apparatus, such as those discussed above, capable of supplying cavitational energy can be introduced in an existing biodiesel process such that the process is retro-fitted with the device. The device can introduced at one or multiple points of a biodiesel production process, for example, prior to a first transesterification reaction or between multiple transesterification reactions.

In order to promote a further understanding of the invention, the following examples are provided. These examples are shown by way of illustration and not limitation.

EXAMPLES 1 AND 2

According to a biodiesel process as shown in FIG. 1, two transesterification reactions were carried out under the conditions shown in Table 1 using commercially available crude de-gummed once refined soy oil as a starting triglyceride feedstock. A pre-reaction mixture was prepared by blending the feedstock with methanol as an alcohol and sodium methylate as a catalyst. The soy oil used contained less than 1.5% free fatty acid, and less than 200 ppm phosphorus or a phosphorous compound. Cavitational energy was supplied by passing the pre-reaction mixture through cavitation static reactor. Cavitation static reactor contained two orifices of 0.58 mm in series at the first stage, and two orifices of 0.64 mm in series at the second stage. Total pre-reaction mixture flow rate was 0.5 gpm. The total pressure drop across the cavitation static reactor was 765 psi. The samples taken from the transesterification reaction mixtures were centrifuged at 2,000 ref for 5 minutes in a GC system used for FAME quantification. Yield of methyl ester was calculated as total yield minus glyceride content. The transesterification reaction was completed in a post reaction pressurized mixer as conventionally used in the art to yield an improved biodiesel product.

A cold soak treatment and filtration test were carried out using a ASTM D6217 filtration procedure. This same procedure was followed in Examples 3, 4 and 5 below. The result of Examples 1 and 2 are shown in Table 1. Further, for the purposes of comparison, the transesterification reaction was carried out conventionally in a pressurized mixer under conditions shown in Table 1 without applying cavitational energy to the pre-reaction mixture. The pre-reaction mixture was of the same formulation as that used in Examples 1 and 2. The result of the comparative example is also shown in Table 1.

TABLE 1

|  | Example 1 | Example 2 | Comparative Example |
|---|---|---|---|
| Cavitation static reactor | Yes | Yes | No |
| Reaction temperature | 65° C. | 100° C. | No |
| Reaction time | 15 sec | 15 sec | No |
| Quantity of catalyst before cavitation reactor (wt % to fat or oil) | 0.35% | 0.35% | No |
| Quantity of Methanol before cavitation reactor (oil/methanol molar ratio) | 1:4.2 | 1:4.2 | No |
| Yield of methyl ester after applying cavitation energy | 81.93% | 74.53% | No |
| Separation temperature | 40-60° C. | 40-60° C. | No |
| Agitation in the pressurized mixer (time) | 4 hr | 4 hr | 4 hr |
| Mixing temperature | 65° C. | 65° C. | 65° C. |
| Quantity of catalyst added to the mixer (wt % to fat or oil) | 0.15% | 0.15% | 0.5% |
| Quantity of Methanol added to the mixer (oil/methanol molar ratio) | 1:1.8 | 1:1.8 | 1:6 |
| Yield of methyl ester after mixing | 99.24 | 99.01 | 99.36 |
| Cold soak test (filtration time in seconds) | 145 sec | 85 sec | 170 sec |

EXAMPLES 3 AND 4

According to a process as shown in FIG. 2, two transesterification reactions were carried out under conditions shown in Table 2 below using commercially available crude de-gummed once refined soy oil as a starting triglyceride feedstock. A pre-reaction mixture was prepared by blending the feedstock with methanol as an alcohol and sodium methylate as a catalyst. The soy oil used preferably contained less than 1.5% free fatty acid, and less than 200 ppm phosphorus or a phosphorous compound.

Cavitational energy was supplied by passing the pre-reaction mixture through cavitation static reactor. Cavitation static reactor contained two orifices of 0.58 mm in series at the first stage and two orifices of 0.64 mm in series at the second stage. Total pre-reaction mixture flow rate was 0.5 gpm. The total pressure drop across the cavitation static reactor was 765 psi. The samples taken from the transesterification reaction mixtures were centrifuged at 2,000 rcf for 5 minutes in a GC system used for FAME quantification. Yield of methyl ester was calculated as total yield minus glyceride content. The results of Examples 3 and 4 are shown in Table 2.

As a comparative example, the transesterification reaction was carried out conventionally in a pressurized mixer under conditions shown in Table 2 without applying cavitational energy to the pre-reaction mixture. The pre-reaction mixture was of the same formulation as that used in Examples 3 and 4. The result of the comparative example is also shown in Table 2.

fatty acid, and less than 200 ppm phosphorus or a phosphorous compound. No comparative example was carried out.

The results of Example 5 are shown in Table 3.

TABLE 3

|  | Example 5 |
|---|---|
| Cavitation static reactor | Yes |
| Reaction temperature | 100° C. |
| Reaction time | 12 sec |
| Quantity of catalyst before cavitation reactor (wt % to fat or oil) | 0.35% |
| Quantity of Methanol before cavitation reactor (oil/methanol molar ratio) | 1:4.2 |
| Resident time in the post reaction chamber | 3 min |
| Temperature in the post reaction chamber | 90° C. |
| Yield of methyl ester after post reaction chamber | 95.80% |
| Separation temperature | 20-50° C. |
| Finishing reaction in the second cavitation static reactor (time) | 12 sec |
| Reaction temperature | 101° C. |
| Quantity of catalyst added to the second cavitation reactor (wt % to fat or oil) | 0.15% |
| Quantity of Methanol added to the second cavitation reactor (oil/methanol molar ratio) | 1:1.8 |
| Resident time in the post reaction chamber | 3 min |
| Temperature in the post reaction chamber | 90° C. |

TABLE 2

|  | Example 3 | Example 4 | Comparative Example |
|---|---|---|---|
| Cavitation static reactor | Yes | Yes | No |
| Reaction temperature | 65° C. | 100° C. | No |
| Reaction time | 15 sec | 15 sec | No |
| Quantity of catalyst before cavitation reactor (wt % to fat or oil) | 0.35% | 0.35% | No |
| Quantity of Methanol before cavitation reactor (oil/methanol molar ratio) | 1:4.2 | 1:4.2 | No |
| Yield of methyl ester after applying cavitation energy | 80.02% | 67.52% | No |
| Agitation in the pressurized mixer (time) | 1 hr | 1 hr | No |
| Mixing temperature | 65° C. | 65° C. | No |
| Separation temperature | 40-60° C. | 40-60° C. | No |
| Agitation in the second pressurized mixer (time) | 3 hr | 3 hr | 4 hr |
| Mixing temperature | 65° C. | 65° C. | 65° C. |
| Quantity of catalyst added to the mixer (wt % to fat or oil) | 0.15% | 0.15% | 0.5% |
| Quantity of Methanol added to the mixer (oil/methanol molar ratio) | 1:1.8 | 1:1.8 | 1:6 |
| Yield of methyl ester after second mixing | 99.28% | 99.20% | 99.18% |
| Cold soak test (filtration time in seconds) | 80 sec | 96 sec | 164 sec |

EXAMPLE 5

In another example, a transesterification reaction was carried as specified in Examples 1 and 2 above except that the improved biodiesel product as described in Examples 1 and 2 was subsequently processed a second time through the cavitation static reactor and post reaction pressurized mixer. The pre-reaction mixture used included commercially available crude de-gummed once refined soy oil as a starting triglyceride feedstock, methanol as an alcohol and sodium hydroxide as a catalyst. The soy oil used contained less than 1.5% free TABLE 3-continued

|  | Example 5 |
|---|---|
| Yield of methyl ester after post reaction chamber | 99.60% |
| Cold soak test (filtration time in seconds) | 75 sec |

It has been found that by applying cavitational energy to pre-reaction mixtures used in a biodiesel production process that biodiesel having an improved cold soak filtration time can result. Applying cavitational energy can achieve high reaction conversion rates in short periods of time (less than 20 seconds). Further, the use of cavitational energy coupled with one, or more separation units in a biodiesel production process efficiently removes glycerol and other impurities, such as steryl glucosides, that increase cold soak filtration times. Surprisingly and unexpectedly it has been found that biodiesel produced by the present invention preferably has less than 10 ppm phosphorus despite the fact that triglyceride feedstocks, such as soybean oil, generally contain 180-200 ppm phosphorus. Glycerol analysis shows that most of the phosphorus and phosphorous compounds were transferred to the glycerol through the use of cavitational energy. As the glycerol by product of the transesterification reaction induced by cavitational energy was removed during the biodiesel product process, an improved biodiesel having the improved filtering characteristics was produced. Without intending to be bound by any one theory to explain the results achieved, it is believed that the use of cavitational energy to the pre-reaction mixture causes many of the non-methyl esters components and impurities, such as phosphorus steryl glucosides, to become entrapped in the glycerol and thus the removed glycerol provides the improved biodiesel fuel having the above-noted characteristics.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

As provided above, a novel process for preparing biodiesel having improved filterability characteristics, wherein cavitational energy is used to provide reaction streams that can be introduced into separation tanks for removing glycerol and impurities during a biodiesel production process. It will be apparent to those skilled in the art that many modifications, variations, substitutions, and equivalents for the features described above may be effected without departing from the spirit and scope of the invention as defined in the claims to be embraced thereby. A preferred embodiment has been described, herein. It will be further apparent to those skilled in the art that the above methods may incorporate changes and modifications without departing from the general scope of this invention. It is intended to include all such modifications and alteration in so far as they come within the scope of the appended claims or the equivalents thereof.

What is claimed is:

1. A process for preparing biodiesel having improved filterability comprising:
   mixing a triglyceride feedstock, alcohol and catalyst to form a pre-reaction mixture;
   forming an intermediate biodiesel reaction mixture comprising fatty acid alkyl esters and glycerol by passing the pre-reaction mixture through a static hydrodynamic cavitation reactor to induce an initial transesterification reaction in said pre-reaction mixture, wherein more than 60 weight percent of said triglycerides in said pre-reaction mixture are converted, wherein the cavitational energy to the pre-reaction mixture does not include the use of ultrasound cavitational energy;
   removing a portion of said glycerol from said intermediate biodiesel reaction mixture;
   completing the initial transesterification reaction by agitating said intermediate biodiesel reaction mixture in a pressurized reaction tank to form a biodiesel reaction product.

2. The process of claim 1, further comprising adding fresh alcohol and catalyst to said pressurized reaction tank.

3. The process of claim 1, wherein at least 95 percent of said triglycerides in said pre-reaction mixture are converted by said passing through a static hydrodynamic cavitation reactor and said agitating in said pressurized reaction tank.

4. The process of claim 1, said intermediate biodiesel reaction mixture being introduced into a separation vessel to remove said portion of said glycerol.

5. The process of claim 1, further comprising heating at least one component of said pre-reaction mixture to a temperature range of 60° C. to 150° C.

6. The process of claim 1, said biodiesel reaction mixture being introduced into said pressurized reaction tank at a temperature range of 30° C. to 65° C.

7. The process of claim 1, said static hydrodynamic cavitation reactor being a flow-through constriction orifice.

8. The process of claim 1, said purified biodiesel reaction product having a cold soak filtration time of less than 150 seconds, said cold soak filtration time being determined by a ASTM D6217 procedure.

9. The process of claim 1, said purified biodiesel reaction product having a cold soak filtration time of less than 90 seconds, said cold soak filtration time being determined by a ASTM D6217 procedure.

10. The process of claim 1, said purified biodiesel reaction product having less than 10 ppm of phosphorous or a phosphorous compound, wherein said triglyceride feedstock of said pre-reaction mixture contains greater than 150 ppm of phosphorous or a phosphorous compound.

11. The process of claim 10, said phosphorous compound being phosphorous steryl glucoside.

12. A process for preparing biodiesel having improved filterability comprising:
    mixing a triglyceride feedstock, alcohol and catalyst to form a pre-reaction mixture;
    forming an intermediate biodiesel reaction mixture by passing the pre-reaction mixture through a static hydrodynamic cavitation reactor to induce an initial transesterification reaction in said pre-reaction mixture, wherein more than 60 weight percent of said triglycerides in said pre-reaction mixture are converted, wherein the cavitational energy to the pre-reaction mixture does not include the use of ultrasound cavitational energy;
    continuing the initial transesterification reaction by agitating said intermediate biodiesel reaction mixture in a pressurized reaction tank to form a biodiesel reaction product comprising fatty acid alkyl esters and glycerol;
    removing a portion of said glycerol from said biodiesel reaction product.

13. The process of claim 12, said static hydrodynamic cavititation reactor being a flow-through constriction orifice.

14. The process of claim 12, further finishing the transesterification reaction by agitating said biodiesel reaction product in a secondary pressurized reaction tank to form a secondary biodiesel reaction product.

15. The process of claim 14, further comprising adding fresh alcohol and catalyst to said secondary pressurized reaction tank.

16. The process of claim 14, further comprising introducing said secondary biodiesel reaction product into a separation vessel to remove glycerol from said secondary biodiesel reaction product.

17. The process of claim 16, said secondary biodiesel reaction product having less than 10 ppm of phosphorous or a phosphorous compound.

18. The process claim 16, said secondary biodiesel reaction product having a cold soak filtration time of less than 150 seconds, said cold soak filtration time being determined by a ASTM D6217 procedure.

19. The process of claim 17, said phosphorous compound being phosphorous steryl glucoside.

* * * * *